United States Patent [19]

Stretanski

[11] 4,240,954
[45] Dec. 23, 1980

[54] POLYMERS STABILIZED AGAINST DEGRADATION BY ULTRAVIOLET RADIATION

[75] Inventor: Joseph A. Stretanski, Clinton, N.J.

[73] Assignee: American Cyanamid Company, Stamford, Conn.

[21] Appl. No.: 15,552

[22] Filed: Feb. 26, 1979

[51] Int. Cl.³ ............................................. C08K 5/16
[52] U.S. Cl. ...................... 260/45.75 F; 260/45.8 R; 260/45.85 R; 260/45.9 R; 260/45.9 NC
[58] Field of Search ................. 260/45.9 R, 45.9 NC, 260/45.85 R, 45.8 R, 45.75 F

[56] References Cited

U.S. PATENT DOCUMENTS

| | | | |
|---|---|---|---|
| 2,766,219 | 10/1956 | Beaver et al. | 260/801 |
| 2,894,933 | 7/1959 | Schweitzer | 260/45.9 |
| 2,960,488 | 11/1960 | Tamblyn et al. | 260/45.9 |
| 3,211,692 | 10/1965 | Hopkins et al. | 260/45.9 NC |
| 3,511,802 | 5/1970 | Newland et al. | 260/45.75 F |
| 3,681,431 | 8/1972 | Dexter et al. | 260/45.9 |

FOREIGN PATENT DOCUMENTS 851575  8/1978  Belgium .

OTHER PUBLICATIONS

Beaver et al., J. Am. Chem. Soc., vol. 79, pp. 1236–1245 (1975).

Primary Examiner—Donald E. Czaja
Assistant Examiner—W. Thompson
Attorney, Agent, or Firm—Bruce F. Jacobs

[57] ABSTRACT

Polymers are stabilized against ultraviolet degradation by the use of urea or thiourea derivatives of the formula:

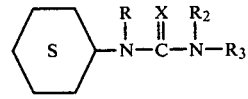

Also disclosed is the use of the above compound with specific hydroxybenzoates or titanium dioxide.

13 Claims, No Drawings

POLYMERS STABILIZED AGAINST DEGRADATION BY ULTRAVIOLET RADIATION

This invention relates to novel compositions of matter which comprise a polymer normally subject to degradation by ultraviolet radiation, particularly a polyolefin such as polypropylene, and a stabilizing amount of (1) a compound represented by formula (I)

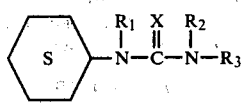

wherein X represents oxygen, or sulfur; $R_1$ and $R_2$ independently represent hydrogen, a cycloalkyl radical of 4 to 6 carbon atoms, an alkyl radical of 1 to 18 carbon atoms, an alkenyl radical of 3 to 12 carbon atoms, or a hydroxyalkyl radical of 2 to 12 carbon atoms; $R_3$ is the same as $R_1$ or $R_2$ with the proviso that it may not be hydrogen; or $R_2$ and $R_3$ taken together with the N to which they are attached form

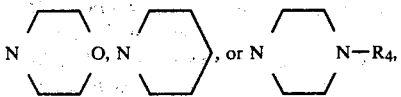

wherein $R_4$ represents alkyl of 1 to 8 carbon atoms. $R_1$ is preferably cyclohexyl, and $R_1$, $R_2$, and $R_3$ are more preferably each cyclohexyl.

Further stabilization may be obtained by using a mixture of a compound of formula (I) and a compound represented by formula (II)

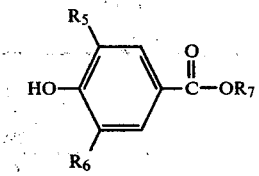

wherein $R_5$ and $R_6$ are each alkyl of 1 to 8 carbon atoms, at least one of which is branched on the alpha carbon atom, and $R_7$ represents alkyl to 1 to 20 carbon atoms, $C_1$-$C_8$ alkyl-substituted phenyl, particularly 2,4-di-t-butylphenyl, halo-substituted phenyl, or aryl-substituted phenyl, and 1,1,3,3-tetracyclohexylurea; and/or an effective amount of titanium dioxide.

It is well-known that sunlight and other sources of ultraviolet radiation cause degradation of polymers, particularly polyolefins such as polypropylene, as evidenced by embrittlement or yellowing of plastic articles made therefrom. It is also well-known that this degradation can be inhibited by use of ultraviolet light stabilizers incorporated in or on such articles. Various additives, used alone or in combinations, have been suggested to inhibit such light degradation in order to prolong the useful lives of articles made from polyolefins. Since none has been found to be completely satisfactory, research continues in order to find compounds, or combinations of compounds, which will be more satisfactory. The present invention arose out of such research and resulted in the discovery of novel compounds which stabilize polyolefins against degradation by ultraviolet light.

U.S. Pat. No. 2,766,219 relates to a sulfur-vulcanizable rubber vulcanizate containing a compound of the structure:

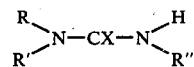

where R and R' represent alicyclic hydrocarbon groups and R" represents a hydrocarbon group, and X is sulfur or oxygen. The present invention is distinguishable in that it does not relate to a sulfur-vulcanizable rubber vulcanizate.

U.S. Pat. No. 2,894,933 relates to a polymerized monovinyl aromatic hydrocarbon of the benzene series containing a stabilizing agent selected from the group consisting of biuret and urea derivatives having the general formula:

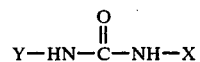

wherein X represents a member of the group consisting of hydrogen, alkyl radicals containing from 1 to 4 carbon atoms, alkenyl radicals containing from 2 to 4 carbon atoms, acetyl, and phenyl radicals, and Y is a member of the group consisting of phenyl and alkyl radicals containing from 1 to 4 carbon atoms. The present invention is distinguishable in that Y is cyclohexyl and X may not be hydrogen, alkenyl, acetyl or phenyl.

Belgium Pat. No. 851,575 relates to ureas as thermooxidative stabilizers for polyolefin molding compositions. However, the ureas which are used are structurally different from the ureas of the present invention.

U.S. Pat. No. 2,960,488 relates to polyolefins containing substituted ureas as light stabilizers. However, the ureas employed are structurally dissimilar from those of the present invention.

In accordance with the present invention, it has been discovered that the above-described stabilizers of formula (I) when used alone or with those of formula (II) and/or titanium dioxide provide effective stabilization of polymers against deterioration by ultraviolet radiation. They are particularly useful in stabilizing polypropylene. These stabilizers may be incorporated in or on such plastic materials by any of the various procedures known in the art for such purpose, such as by dry blending the additive with the polymer in powder or granular form followed by milling, Banbury mixing, molding, casting, extruding, swelling, and the like; by immersing the polymer as film, sheet, fibers, and the like, in a solution of the additive in an appropriate solvent (as in a dyeing process).

Illustrative of polymers which may be used as the polymeric material in the subject invention are the following:
polyethylene,
polypropylene,
poly(vinyl chloride),
poly(methyl methacrylate),
polystyrene,
high impact polystyrene,
polycarbonate,
polycaprolactam,
poly(hexamethylene adipamide), poly(hexamethylene terephthalamide),
poly(methyl acrylate),
poly(ethylene terephthalate),
cellulose acetate, and the like, and blends thereof.

The preferred material is polypropylene.

The compounds of formula (I) can be prepared by methods well-known in the art. See Beaver et al., J. Am. Chem. Soc. 79, pgs, 1236-1245 (1957), incorporated herein by reference.

The amount of the stabilizers needed to be an effective amount for stabilizing the polymer against degradation will depend on the nature of the polymer and the amount of exposure to ultraviolet radiation to which the composition will be subjected.

For most purposes it is sufficient to use an amount of the compound of formula (I) within the range of about 0.1 to about 5 percent by weight, preferably 0.2 to 2 percent by weight, based on the weight of untreated polymer.

The following compounds are illustrative of the stabilizers represented by formula (I):
1,1,3,3-tetracyclohexylurea,
1,1,3-tricyclohexylurea,
1,1-dicyclohexyl-3,3-dimethylurea,
1,3-dicyclohexyl-1-methylurea,
1-cyclohexyl-3,3-diallylurea,
1,1,3,3-tetracyclohexylthiourea,
1,1,3-tricyclohexylthiourea,
1-cyclohexyl-3,3-dimethylurea,
1-cyclohexyl-3,3-dimethylthiourea,
1,1-dicyclohexyl-3-methylurea,
1,3-dicyclopentyl-1-(2-hydroxyethyl)urea,
1-cyclohexyl-3-(1,1-dimethyl-2-hydroxyethyl)urea,
1-cyclopentyl-3,3-dimethylurea,
4-cyclohexylcarbamoylmorpholine,
1-cyclohexylcarbamoylpiperidine,
1-cyclohexylcarbamoyl-2,2,6,6-tetramethylpiperidine,
1-cyclohexylcarbamoyl-4-methyl-piperazine,
1-cyclohexylcarbamoyl-4-n-octyl-piperazine, and the like.

For most purposes when the stabilizers of formula (I) are used along with those of formula (II), it is sufficient to use about 0.05 to about 2.5 percent by weight, of the compound of formula (I) and about 0.05 to about 2.5 percent by weight of the compound of formula (II), each based on the weight of untreated polymer.

The following 3,5-dialkyl-4-hydroxybenzoic acid esters are exemplary of the compounds of formula (II):
n-octadecyl 3,5-di-t-butyl-4-hydroxybenzoate,
n-dodecyl 3,5-di-t-butyl-4-hydroxybenzoate,
n-hexadecyl 3,5-di-t-butyl-4-hydroxybenzoate,
n-hexyl 3,5-di-t-butyl-4-hydroxybenzoate,
methyl 3,5-di-t-octyl-hydroxybenzoate,
cyclohexyl 3-octyl-5-t-butyl-hydroxybenzoate,
o-tert-butylphenyl 3,5-di-t-butyl-hydroxybenzoate,
o-chlorophenyl 3,5-di-t-butyl-hydroxybenzoate,
2,4-di-t-butylphenyl 3,5-di-t-butyl-hydroxybenzoate,
2-bromo-4-t-butylphenyl 3,5-diisopropyl-4-hydroxybenzoate,
biphenyl 3-octyl-5-t-butyl-hydroxybenzoate, and the like.

The preparation of compounds of formula (II) can be found in the literature, such as U.S. Pat. No. 3,681,431, incorporated herein by reference.

For most purposes when the stabilizers of formula (I) are used along with titanium dioxide, it is sufficient to use about 0.1 to 5 percent by weight, preferably about 0.2 to 2 percent by weight, of the compound of formula (I) and about 0.25 to 5 percent by weight, preferably about 1 to 3 percent by weight, of titanium dioxide, each based on the weight of untreated polymer.

The stabilizers can be used as described or in combination with other conventional additives, such as fillers, antioxidants, flame retardants, heat stabilizers, anti-slipping and anti-static agents, supplemental light stabilizers, pigments, dyes, lubricants, and the like. Any further additive is advantageously employed in conventional amounts.

The following examples, in which parts and percentages are by weight unless otherwise stated, are presented to further illustrate the present invention.

EXAMPLES 1-10

Evaluation of Light Stabilization Properties

The resistance to degradation by ultraviolet light is determined by dry-blending and milling 0.5 part of the additive under test, 100 parts of unstabilized polypropylene (Profax ® 6401, Hercules Incorporated, Wilmington, Del.) and 0.2 part of 2,4,6-tri-t-butylphenol, a processing antioxidant, on a standard two-roll mill at 350°-370° F. for 4-5 minutes and compression molding the milled composition at 400° F. into films 4-5 mils thick. The film is then exposed in a carbon arc Atlas Fade-Ometer ®, hereafter abbreviated FOM, and in a xenon arc Atlas Weather-Ometer ®, without using a water spray, hereafter abbreviated WOM, until the carbonyl content of the film increases by 0.10 percent by weight, as determined by infrared spectrophotometric measurement. A control film identically prepared, without the additive under test, is similarly prepared and tested. The time in hours required to increase the carbonyl content of the film by 0.1 percent coincides with the time required to reach the point of embrittlement.

The results obtained with various compositions of this invention are shown in Table I.

TABLE I

| Example | Additive | Time (Hr.) to Δ Wt. % Carbonyl of 0.10% | |
|---|---|---|---|
| | | FOM | WOM |
| 1 | $(\langle S \rangle)_2\text{-N-C(=O)-N-}(\langle S \rangle)_2$ | 1600 | 1800-2000 |
| 2 | $(\langle S \rangle)_2\text{-N-C(=O)-N(H)-}\langle S \rangle$ | 600 | 1300 |
| 3 | $(\langle S \rangle)_2\text{-N-C(=O)-N(CH}_3)_2$ | 500 | 1200 |
| 4 | $\langle S \rangle\text{-N(H)-C(=O)-N(CH}_3)\text{-}\langle S \rangle$ | 500 | 1150 |
| 5 | $\langle S \rangle\text{-N(H)-C(=O)-N(CH}_2\text{CH=CH}_2)_2$ | 500 | 1150 |
| 6 | $\langle S \rangle\text{-N(H)-C(=O)-N(morpholino)}$ | 500 | 1150 |
| 7 | $(\langle S \rangle)_2\text{-N-C(=S)-N(H)-}\langle S \rangle$ | 600 | 1100 |
| 8 | $\langle S \rangle\text{-N(H)-C(=O)-NH-C(CH}_3)(\text{CH}_2\text{OH})(\text{CH}_3)$ | 400 | 1100 |

TABLE I-continued

| Example | Additive | Time (Hr.) to Δ Wt. % Carbonyl of 0.10% | |
|---|---|---|---|
| | | FOM | WOM |
| 9 | 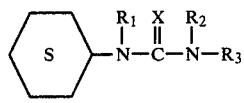 | 400 | 950 |
| 10 | None | 0-300 | 600-800 |

EXAMPLES 11-16

The procedure of Examples 1-10 is repeated using a total amount of 0.5 part of the additive, or combination of additives, under test together with 100 parts of unstabilized polypropylene and 0.2 part of 2,4,6-tri-t-butylphenol in the composition. The results obtained are shown in Table II.

TABLE II

| Example | Additive | Concentration | Time (Hr.) to Δ Wt. % Carbonyl of 0.10% | |
|---|---|---|---|---|
| | | | FOM | WOM |
| 11 | A[a] | 0.5% | 1800 | 1800-2000 |
| 12 | B[b] | 0.5% | 2100 | 3200 |
| 13 | C[c] | 0.5% | 1100 | 2000 |
| 14 | A + B | 0.25% each | 3100 | 3800 |
| 15 | A + C | 0.25% each | 2300 | 3400 |
| 16 | None | — | 0-300 | 600-800 |

[a]1,1,3,3-tetracyclohexylurea
[b]2,4-di-t-butylphenyl 3,5-di-t-butyl-4-hydroxybenzoate
[c]n-hexadecyl 3,5-di-t-butyl-4-hydroxybenzoate The results in Table II show that the stabilizing activities of the mixtures of A+B, and A+C, are higher than those of A, B, or C alone at the same total concentrations.

EXAMPLES 17-20

The procedure of Examples 1-10 is repeated using the additives and concentrations shown in Table III.

TABLE III

| Example | Additive | Concentration | Time (Hr.) to Δ Wt.% Carbonyl of 0.1% | |
|---|---|---|---|---|
| | | | FOM | Xenon WOM |
| 17 | A[a] | 0.5% | 1000 | 1400 |
| 18 | TiO2 | 2.0% | 300 | 1000 |
| 19 | A + TiO2 | 0.5% and 2.0% | 1800 | 2400 |
| 20 | None | — | 0-300 | 600-800 |

[a]1,1,3,3-tetracyclohexylurea

The results in Table III show that excellent stabilization to ultraviolet radiation is imparted to the polypropylene by the combination of additive A and titanium dioxide.

What is claimed is:

1. A method of stabilizing a polyolefin against degradation by ultraviolet radiation which comprises adding to said polyolefin a stabilizingly effective amount of a compound of the formula (I):

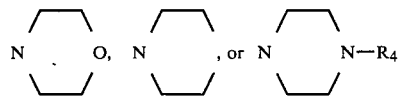

wherein X represents O or S; $R_1$ is cyclohexyl; $R_2$ represents hydrogen, a cycloalkyl radical of 4 to 6 carbon atoms, an alkyl radical of 1 to 18 carbon atoms, an alkenyl radical of 3 to 12 carbon atoms, or a hydroxyalkyl radical of 2 to 12 carbon atoms; $R_3$ represents the same groups as $R_2$ with the proviso that it may not be hydrogen, or $R_2$ and $R_3$ taken together with the N to which they are attached form

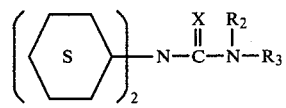

wherein $R_4$ represents alkyl of 1 to 8 carbon atoms.

2. The method of claim 1 wherein said compound is represented by the formula:

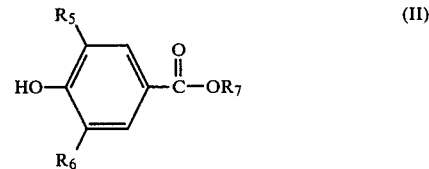

wherein X is O and $R_2$ and $R_3$ are as previously defined.

3. The method of claim 1 wherein said stabilizingly effective amount is about 0.1% to about 5% by weight based on the weight of said polymer.

4. The method of claim 1 wherein said polyolefin is polypropylene.

5. The method of claim 1 wherein the compound is 1,1,3,3-tetracyclohexylurea.

6. The method of claim 1 wherein the compound is 1,1,3-tricyclohexylurea.

7. The method of claim 1 comprising adding, in addition, a compound of the formula (II):

$$\text{HO} \underset{R_6}{\overset{R_5}{\underset{}{\bigcirc}}} \text{C(=O)-OR}_7 \quad (II)$$

wherein $R_5$ and $R_6$ are each alkyl of 1 to 8 carbon atoms, at least one of which is branched on the alpha carbon atom, and $R_7$ represents alkyl of 1 to 20 carbon atoms, $C_1$–$C_8$ alkyl-substituted phenyl, halo-substituted phenyl, or aryl-substituted phenyl.

8. The method of claim 7 wherein the compounds of Formulae (I) and (II) are each used at about 0.05% to about 2.5% by weight based on the weight of said polyolefin.

9. The method of claim 7 wherein said polyolefin is polypropylene.

10. The method of claim 7 wherein the compound of Formula (I) is 1,1,3,3-tetracyclohexylura.

11. The method of claim 10 wherein said compound of Formula (II) is 2,4-di-t-butylphenyl 3,5-di-t-butyl-4-hydroxybenzoate.

12. The method of claim 10 wherein the compound of Formula (II) is n-hexadecyl 3,5-di-t-butyl-4-hydroxybenzoate.

13. The method of any one of claims 1, 5, 7, 10, 11 or 12 comprising adding, in addition, titanium dioxide.

* * * * *